No. 706,838. Patented Aug. 12, 1902.
H. K. BLYTH.
ELBOW AND PIPE.
(Application filed Nov. 6, 1901.)
(No Model.)

Witnesses:
Samuel W. Banning
Oscar W. Bond

Inventor:
Herbert K. Blyth
By Banning & Banning
Attys

THE NORRIS PETERS CO., PHOTO-LITHO., WASHINGTON, D. C.

UNITED STATES PATENT OFFICE.

HERBERT K. BLYTH, OF CHICAGO, ILLINOIS, ASSIGNOR OF ONE-HALF TO ROBERT L. NELSON, OF CHICAGO, ILLINOIS.

ELBOW AND PIPE.

SPECIFICATION forming part of Letters Patent No. 706,888, dated August 12, 1902.

Application filed November 6, 1901. Serial No. 81,302. (No model.)

*To all whom it may concern:*

Be it known that I, HERBERT K. BLYTH, a citizen of the United States, residing in Chicago, in the county of Cook and State of Illinois, have invented certain new and useful Improvements in Elbows and Pipes, of which the following is a specification.

The object of this invention is to produce a pipe the sections of which may be locked or fastened together and an elbow so constructed that it may be locked into the pipe and at the same time may be turned or adjusted to any suitable angle of curvature without unlocking it from the pipe. Moreover, these desirable results may be obtained without increasing the complexity or cost of the pipe and elbow and without necessitating the employment of new or unusual tools in their construction.

Figure 1:
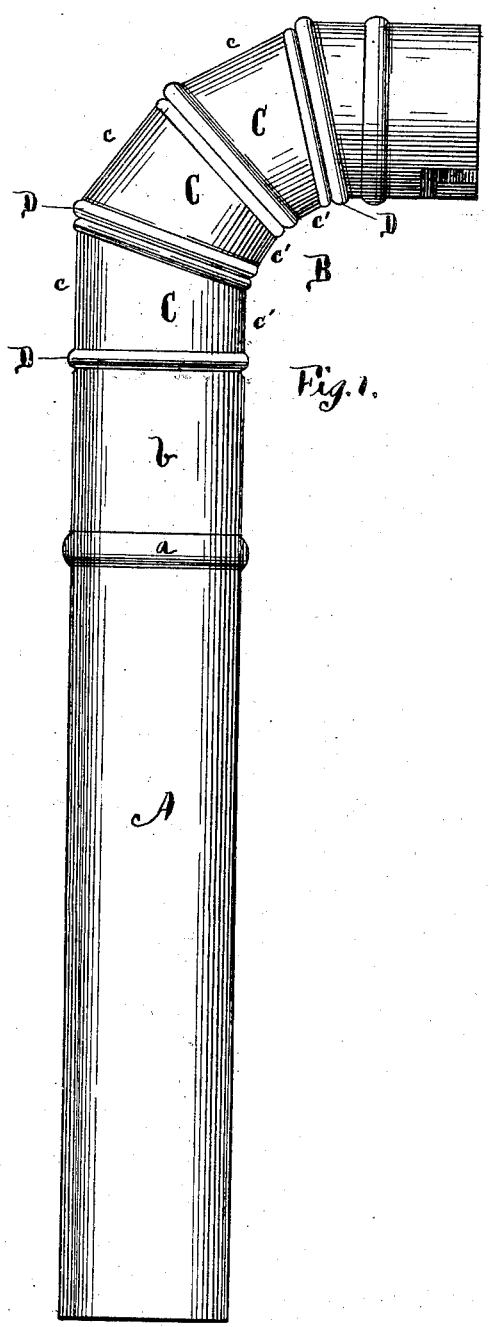
Figure 2:
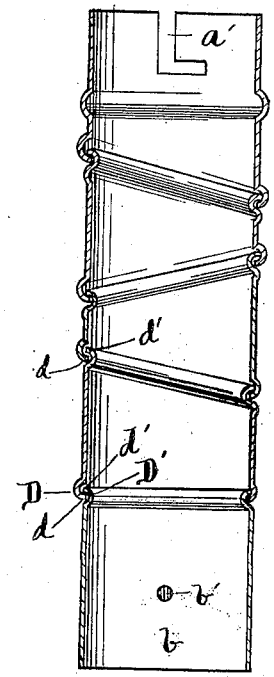

In the drawings illustrating the invention, Figure 1 is a side elevation of a section of pipe with the elbow attached by means of an entering lock-section and adjusted to form a right-angle joint; Fig. 2, a sectional view of the elbow in its straightened position with the locking-section revolubly attached; and Fig. 3, a sectional view of a portion of the pipe with the locking-section attached, showing the method of interlocking employed.

Figure 3:
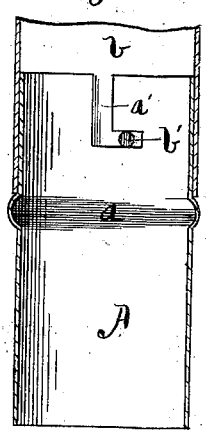

As constructed, A represents a section of pipe, and B the elbow attached thereto. The pipe is preferably provided with a bead $a$, which forms a suitable contact for the locking section or thimble carried by the elbow, as shown in Fig. 1. The section of pipe, as shown in Fig. 3, is provided at its end with an L-shaped slot $a'$.

The locking section or thimble $b$ is cylindrical in shape, for a reason to be hereinafter explained. This locking-section is provided with a pin $b'$, engaging with the slot in the end of the section of pipe and forming therewith a bayonet-joint. It is usually desirable to have the slots and pins on the side of the pipe opposite to the longitudinal seam or joint, although this arrangement is not considered indispensable. Although this interlocking means is used for purposes of illustration, I do not desire to limit myself specifically to it, as other interlocking means may be employed.

The sections C of the elbow are made in the form of segments, each having a long side $c$ and a short side $c'$. These segments and the locking-section are revolubly attached one to the other by means of companion beads D and D', so formed that the free ends $d$ and $d'$ will revolve within the grooves formed by the beads and allow the segments to be turned to any desired position in relation to one another. When it is desirable to employ the elbow to form a right-angle joint between segments of pipe, the segments composing the elbow are so turned that their short sides will be in line on the inside of the elbow and their long sides will be in line on the outside of the elbow, thereby forming the angle, as shown in Fig. 1. By varying the relative position of the short sides and long sides of the segments it is possible to adjust the elbow to any desired angle of curvature, or it may be entirely straightened, as shown in Fig. 2, by alternating the long and short sides of the segments. The locking section or thimble is made cylindrical in order that the connection between it and the adjoining segment of the elbow may allow the elbow to be revolved in a true circle, thereby enabling it to be turned in any direction when so desired without changing its angle of curvature. This arrangement enables the locking-section to be locked to the pipe and still permits the elbow to be turned to any desired direction with or without varying in its angle of curvature and without unlocking it from the pipe, thereby affording greater rigidity and permanence than is possible by merely slipping the elbow into the section of pipe, as in ordinary construction.

Although the ordinary stovepipe shown, made out of thin sheet metal, has been employed for purposes of description and illustration, it is plain that the invention is not limited to pipes of this character, but may be employed with seamless tubing or with any ordinary pipe employing sections and elbows. It is preferred to locate the interlocking slot and the engaging pin directly opposite the seam of the pipe, as by so doing the seams of the several sections when the sections are united one to the other will be in alinement, furnishing a double support for the extended pipe, which support is also strengthened by the lock of the pin in the transverse portion of the slot, the pin bearing against the edge of the slot. The elbow illustrated is one having its divisions or segments joined so as to turn or revolve, which gives a torsional joint to the elbow as a whole from the turning or revolving of the intermediate division or section, and it will thus be seen that the elbow has a torsional joint and also a swivel-joint formed by the transverse joint between the revoluble end section or thimble and the end of the elbow, and it is to be understood that this transverse or swivel joint for the end of the locking section or thimble is applicable to and can be used with a joint having its sections rigidly connected, and when so used it subserves its office of enabling the pipe to be turned at right angles without destroying the interlock between the elbow and the pipe-sections. The elbow shown has one end section joined by a transverse joint at right angles, while the other end is joined by a diagonal joint, and one end section or thimble has a slot and the other end section or thimble a locking-pin, so that one end can be entered into a pipe-section and the other end slipped over the end of a pipe-section, as usual in joining an elbow to pipe-sections.

What I claim as new, and desire to secure by Letters Patent, is—

1. An elbow for pipes, consisting of intermediate sections of segmental form revolubly connected one to the other by means of interlying companion grooves and beads in the ends of the adjacent segments, a locking-section of cylindrical form revolubly attached by the same means to one of the segments and having its attached end lying in right-angle transverse relation to its longitudinal plane, in combination with a pipe united to the locking-section by suitable locking means, substantially as described.

2. An elbow for pipes consisting of intermediate sections of segmental form revolubly connected one to the other, a locking-section of cylindrical form revolubly attached to one of the segments and having its attached end lying in right-angle transverse relation to its longitudinal plane, in combination with a pipe united to the locking-section by means of a bayonet catch-lock, substantially as described.

3. An elbow for sheet-metal seamed pipes, consisting of a series of intermediate sections of segmental form revolubly connected one to the other, an end locking-section of cylindrical form revolubly attached to one of the segments and having its attached end lying in right-angle transverse relation to its longitudinal plane, in combination with a pipe united to the locking-section by means of a bayonet catch-lock located transversely opposite to the seam of the pipe, substantially as described.

4. An elbow for sheet-metal seamed pipes, consisting of a series of intermediate sections of segmental form revolubly connected by means of interlying companion grooves and beads in the ends of the adjacent segments, an end locking-section cylindrical in form and revolubly attached by interlying companion grooves and beads to one of the segments and having its attached end lying in right-angle transverse relation to its longitudinal plane, in combination with a pipe united to the locking-section by means of a bayonet catch-lock located opposite to the seam of a pipe, substantially as described.

HERBERT K. BLYTH.

Witnesses:
SAMUEL W. BANNING,
OSCAR W. BOND.